US012590481B2

(12) United States Patent
Brendel

(10) Patent No.: US 12,590,481 B2
(45) Date of Patent: Mar. 31, 2026

(54) GUIDE DEVICE FOR A SLIDING SCREEN SYSTEM

(71) Applicant: Inter IKEA Systems B.V., Delft (NL)

(72) Inventor: Stefan Brendel, Markaryd (SE)

(73) Assignee: Inter IKEA Systems B.V. (NL)

( * ) Notice: Subject to any disclaimer, the term of this patent is extended or adjusted under 35 U.S.C. 154(b) by 0 days.

(21) Appl. No.: 18/860,684

(22) PCT Filed: Apr. 25, 2023

(86) PCT No.: PCT/SE2023/050380
§ 371 (c)(1),
(2) Date: Oct. 27, 2024

(87) PCT Pub. No.: WO2023/211341
PCT Pub. Date: Nov. 2, 2023

(65) Prior Publication Data

US 2025/0277397 A1 Sep. 4, 2025

(30) Foreign Application Priority Data

Apr. 28, 2022 (SE) .................................... 2250508-5

(51) Int. Cl.
*A47H 15/00* (2006.01)
*E05D 15/06* (2006.01)
*E06B 3/46* (2006.01)

(52) U.S. Cl.
CPC ........ *E05D 15/0682* (2013.01); *E06B 3/4663* (2013.01); *E05Y 2201/708* (2013.01);
(Continued)

(58) Field of Classification Search
CPC ..... E05D 15/00; E05D 15/1005; E05D 15/28; E05D 15/0608; E05D 15/0621;
(Continued)

(56) References Cited

U.S. PATENT DOCUMENTS 2,912,714 A * 11/1959 Rich ................... E05D 15/0669
16/DIG. 34
2,999,267 A * 9/1961 Sterling .............. E05D 15/0634
16/105
(Continued)

FOREIGN PATENT DOCUMENTS

CN 204212587 U * 3/2015
CN 209353932 U * 9/2019 ............. E05D 15/06
(Continued)

OTHER PUBLICATIONS

English abstract for JP2003129733.
(Continued)

*Primary Examiner* — Chuck Y Mah
(74) *Attorney, Agent, or Firm* — Fishman Stewart PLLC

(57) ABSTRACT

The disclosure relates to a guide device for a sliding screen system. The guide device includes a housing, a height adjustment element arranged to be set in different positions in a height direction, and a manually operable pivot connected to the housing for pivoting around a pivot axis and connected to the height adjust-ment element for moving the height adjustment element when pivoted. The housing includes a first toothed structure extending in a circular path around the pivot axis. The manually operable pivot includes a second toothed structure extending in a circular path around the pivot axis. The first toothed structure and the second toothed structure engage each other. The housing includes at least one finger that is radially flexible relative the pivot axis and that includes a section of the first toothed structure.

20 Claims, 5 Drawing Sheets

(52) U.S. Cl.
CPC ....... *E05Y 2201/71* (2013.01); *E05Y 2600/12* (2013.01); *E05Y 2900/20* (2013.01)

(58) Field of Classification Search
CPC ... E05D 15/0626; E05D 15/264; E05D 15/06; E05D 15/063; E05D 15/0643; E05D 15/0647; E05D 15/165; E05D 15/0653; E05D 15/26; E05D 15/262; E05Y 2201/64; E05Y 2201/688; E05Y 2201/708; E05Y 2201/612; E05Y 2201/614; E05Y 2900/531; E05Y 2900/532; E05Y 2900/20; E05Y 2900/131; E05Y 2900/132; E05Y 2900/142; E06B 3/50; E06B 3/485; E06B 9/36; E06B 3/42; E06B 3/46; E06B 3/4609; E06B 3/4636; B60J 5/06; B60J 5/062; B60J 5/047; B60J 5/12; B60J 5/04; A47H 2023/025; A47H 1/04; A47H 15/00; A47H 15/02; A47H 15/04
See application file for complete search history.

(56) References Cited

U.S. PATENT DOCUMENTS

| | | | | | |
|---|---|---|---|---|---|
| RE25,246 | E * | 9/1962 | Majeske | E05D 15/0634 16/105 |
| 3,237,238 | A * | 3/1966 | Anderson | E05D 15/0669 16/105 |
| 4,134,178 | A | 1/1979 | Stevens | |
| 4,194,266 | A * | 3/1980 | Natzel | E05D 15/0669 16/DIG. 34 |
| 5,161,330 | A * | 11/1992 | Auriemma | E05D 15/0669 49/420 |
| 5,845,363 | A | 12/1998 | Brempell | |
| 6,185,784 | B1 * | 2/2001 | Gamperle | E05D 15/0634 16/99 |
| 11,629,538 | B2 * | 4/2023 | Minter | E05D 15/0634 16/105 |
| 2005/0011041 | A1 * | 1/2005 | Ness | E05D 15/0669 16/105 |
| 2009/0003928 | A1 * | 1/2009 | Ohrstrom | E06B 3/9647 403/205 |
| 2012/0005964 | A1 * | 1/2012 | Isaacs | E05D 15/066 49/452 |
| 2014/0150209 | A1 | 6/2014 | Tidwell | |
| 2020/0208451 | A1 * | 7/2020 | Tarrega Klein | E05D 15/0634 |

FOREIGN PATENT DOCUMENTS

| | | | |
|---|---|---|---|
| CN | 211201517 | U * | 8/2020 |
| DE | 202016102679 | U1 | 6/2016 |
| JP | 03208978 | A * | 9/1991 |
| JP | 10205209 | A * | 8/1998 |
| JP | 2000054720 | A | 2/2000 |
| JP | 2003129733 | A * | 5/2003 |
| WO | 2012152909 | A1 | 11/2012 |

OTHER PUBLICATIONS

English abstract for DE202016102679.
ISR for PCT/SE2023/050380, dated May 30, 2023.
English abstract for JP2000054720.

* cited by examiner

GUIDE DEVICE FOR A SLIDING SCREEN SYSTEM

CROSS-REFERENCES TO RELATED APPLICATIONS

This application is a National Stage application which claims the benefit of International Application No. PCT/SE2023/050380 filed Apr. 25, 2023, which claims priority based on Swedish Application No. 2250508-5, filed Apr. 28, 2022, both of which are hereby incorporated by reference in their entirety.

TECHNICAL FIELD

The invention relates to a guide device for a sliding screen system comprising a housing, a height adjustment element arranged to be set in different positions in a height direction relative to the housing, a manually operable pivot means pivotably connected to the housing for pivoting around a pivot axis and operatively connected to the height adjustment element for moving the height adjustment element in the height direction when pivoted. The height adjustment element may be provided with a slide rail engagement structure, such as a sliding surface or a roller.

The invention further relates to a sliding screen system for a sliding screen comprising the guide device and an elongated slide rail, wherein the elongated slide rail and the guide device are adapted for contacting each other during movement of the guide device along the elongated slide rail.

The sliding screen system may be realized in a piece of furniture, such as a wardrobe, a cabinet, cupboard, sideboard and chest of drawers. Here, a main body (platform) of the piece of furniture is provided with the elongated slide rail and the sliding screen is provided with the guide device, which interact with the elongated slide rail. The sliding screen system may alternatively be realized for a sliding screen that is slidable in relation to a structure, such as a wall/floor/ceiling in a building.

BACKGROUND

According to prior art, a main sliding arrangement is adapted to carry a weight of the screen and an auxiliary sliding arrangement is adapted for steering the screen during a sliding movement defined by the main sliding arrangement and reducing the risk that the guide component will fall out of the associated elongated slide rail. The invention is related to such a main sliding arrangement. The main sliding arrangement may be located at a lower edge of the sliding screen so that the sliding screen is then resting on a slide rail ("standing sliding screen"). The auxiliary sliding arrangement is then located at an upper edge of the sliding screen.

Due to manufacturing tolerances and due to the fact that the floor on which the piece of furniture is placed is often not level, it is usually necessary that the slide rail engagement structure, such as a sliding surface or a roller, is adjustable in its vertical position (i.e. in a height direction) with respect to the sliding screen. Various height adjustment systems are known for this purpose.

DE 20 2016 102 679 U1 discloses a guide device for a sliding screen comprising a housing, a height adjustment element arranged to be set in different positions in a height direction relative to the housing, a manually operable pivot means pivotably connected to the housing for pivoting around a pivot axis and operatively connected to the height adjustment element for moving the height adjustment element in the height direction when pivoted. The manually operable pivot means has an adjusting wheel with external teeth and a shaft extending from this adjusting wheel. The shaft has a first bearing section, an adjoining intermediate adjustment section and a second bearing section, which are all circular-cylindrical. The first bearing section and the second bearing section being coaxial with one another, so that their common axis defines the pivot axis. The housing comprises two walls spaced in the direction of the pivot axis and each wall being provided with a circular hole for receipt of the first bearing section and the second bearing section, respectively. The intermediate adjustment section is eccentric with respect to the pivot axis. The outer surface of the intermediate adjustment section forms a contact surface for effecting an upwards facing contact surface of the height adjustment element. Further, the housing has two opposing guide surfaces on either side of the pivot axis, which extend in the height direction, for guiding the height adjustment element. When the housing is mounted on a sliding screen, the contact surfaces are always in contact with each other due to gravitation, since the weight of the sliding screen acts on the housing. Thus, when the adjusting wheel is rotated in one direction, the height adjustment element may be adjusted upwards/downwards.

SUMMARY

A first object of the invention is to achieve a guide device for a sliding screen, which creates conditions for a more space-efficient solution.

The object is achieved by a device according to claim 1. Thus, it is achieved by a guide device for a sliding screen comprising a housing, a height adjustment element arranged to be set in different positions in a height direction relative to the housing, a manually operable pivot means pivotably connected to the housing for pivoting around a pivot axis and operatively connected to the height adjustment element for moving the height adjustment element in the height direction when pivoted, characterized in that the manually operable pivot means is adapted to support the height adjustment element so that the height adjustment element may be moved upwards and downwards, respectively, between the different positions in the height direction corresponding to a pivoting of the manually operable pivot means clockwise and counter clockwise, respectively.

According to one example, each one of the manually operable pivot means and the height adjustment element comprises a bearing section and the bearing sections are adapted for engagement. Thus, the height adjustment element is carried by the manually operable pivot means. According to one example, the height adjustment element is journaled in the manually operable pivot means.

Since the manually operable pivot means is adapted to support the height adjustment element, a total installation height may be reduced in comparison to prior art. More specifically, the manually operable pivot means may be arranged in relation to the housing such that the pivot axis is at a lower position in the height direction relative to an upper peripheral surface of a main body of the height adjustment element.

Since the manually operable pivot means is adapted to support the height adjustment element, the housing does not need to be designed for supporting the height adjustment element. Thus, the housing may be of a simple design creating conditions for a cost-efficient manufacturing.

According to one embodiment example, the height adjustment element is adapted to be moved in an arcuate path relative to the housing around the pivot axis between the different positions in the height direction. The housing may be provided with an opening of a sufficient size to allow for the movement of the height adjustment element in the arcuate path relative to the housing. Accordingly, the housing may be provided with an opening of a sufficient transverse size to allow for free movement of the height adjustment element without contacting the housing in a transverse direction relative to the height direction.

According to one further development of the last-mentioned embodiment example, the height adjustment element is adapted to be arranged parallel displaced in different height positions along the arcuate path. It is advantageous when the height adjustment element is provided with a slide rail engagement structure in the form of a sliding surface since the orientation of the sliding surface may be the same irrespective of the height position of the height adjustment element.

According to one further embodiment example, a first one of the manually operable pivot means and the height adjustment element comprises a projection extending in parallel with the pivot axis, wherein an outer peripheral surface of the projection defines a first engagement structure, and wherein a second one of the manually operable pivot means and the height adjustment element comprises a recess extending in parallel with the pivot axis, wherein an inner peripheral surface defining the recess defines a second engagement structure and wherein the projection is adapted to be received in the recess so that the first engagement structure and the second engagement structure engage each other.

According to one example, the manually operable pivot means comprises a projection in the form of a shaft and the height adjustment element comprises a recess in the form of a hole, wherein the shaft and the hole are provided with substantially the same shape and size.

According to one further development of the last-mentioned embodiment example, each one of the projection and the recess has a circular cylindrical shape for allowing a relative pivoting movement between the manually operable pivot means and the height adjustment element. Thus, the circular cylindrical portions of the manually operable pivot means and the height adjustment element forms bearing sections adapted for engagement with each other.

According to one further development of the last-mentioned embodiment example, a centre axis of the projection or recess of the manually operable pivot means is in parallel with and offset in relation to the pivot axis. In other words, the centre axis of the projection or recess of the manually operable pivot means is eccentric in relation to the pivot axis. Due to the eccentricity, the height adjustment element may be moved in the arcuate path.

According to one further embodiment example, the housing comprises a through hole adapted to receive a portion of the manually operable pivot means, wherein the through hole extends in a transverse direction relative to the height direction, wherein the manually operable pivot means comprises a first part adapted to be moved into the through hole from a first end of the through hole and a second part adapted to be moved into the through hole from a second end of the through hole and wherein the first part and the second part are adapted for being rotationally rigidly connected to each other via a relative motion in parallel with an axis of said through hole. It creates conditions for an easy assembly.

According to one further development of the last-mentioned embodiment example, the first part comprises a handle for being pivoted by a user for pivoting the manually operable pivot means relative to the housing. It creates further conditions for an easy assembly.

According to one further development of the last-mentioned embodiment example, the second part comprises the projection or recess provided with the first engagement structure or second engagement structure. Thus, the second part, which is assembled from a back side of the housing relative to the first part with the handle, may be provided with the bearing section for engagement with the height adjustment element.

According to one further development of the last-mentioned embodiment example, the first part and the second part comprises snap engagement structures for a snapping engagement during the relative motion in parallel with the axis of said through hole. It creates further conditions for an easy assembly.

According to one further embodiment example, the housing comprises a first toothed structure extending in a circular path around the pivot axis, wherein the manually operable pivot means comprises a second toothed structure extending in a circular path around the pivot axis, wherein the manually operable pivot means is adapted to be arranged relative to the housing so that the first toothed structure and the second toothed structure engage each other, wherein the toothed structures define a plurality of discrete relative angular positions, which correspond to the different positions of the height adjustment element in the height direction relative to the housing.

According to one further development of the last-mentioned embodiment example, the housing comprises at least one finger that is radially flexible relative the pivot axis and that comprises a section of the first toothed structure and is adapted to flex radially outwards during pivoting when opposite teeth meet and back again when the teeth of one of the first toothed structure and the second toothed structure meet spaces between the teeth of the other one of the first toothed structure and the second toothed structure during height adjustment.

According to one further embodiment example, the manually operable pivot means is arranged relative to the housing in a way that the pivot axis is perpendicular relative to the height direction.

According to one further embodiment example, the height adjustment element is adapted for being guided by an associated elongated slide rail during movement of the guide device relative to the elongated slide rail and wherein the height adjustment regards adjustment in a direction perpendicular to the elongated slide rail.

According to one further development of the last-mentioned embodiment example, the height adjustment element comprises a first slide surface that is adapted for a sliding contact with a second slide surface of the elongated slide rail during the movement of the guide device relative to the elongated slide rail.

According to a further aspect of the invention, it regards a sliding screen system for a sliding screen, wherein the sliding screen system comprises the guide device according to any preceding embodiment example, and an elongated slide rail, wherein the elongated slide rail and the guide device are adapted for contacting each other during movement of the guide device along the elongated slide rail.

According to one embodiment example, the sliding screen system comprises a sliding screen, a platform and a guide device according to any one of the above embodiment examples, wherein the housing is adapted for being rigidly connected to the sliding screen and the elongated slide rail is adapted for being rigidly connected to the platform so that the sliding screen may be moved relative to the platform in a way that the height adjustment element is in engagement with the elongated slide rail.

The sliding screen system may be realized in a piece of furniture, such as a wardrobe, a cabinet, cupboard, sideboard and chest of drawers. Here, a main body (platform) of the piece of furniture, such as a panel, is provided with the elongated slide rail and the sliding screen is provided with the guide device, which interacts with the elongated slide rail. The sliding screen system may alternatively be realized for a sliding screen that is slidable in relation to a structure, such as a wall/floor/ceiling in a building.

According to one further embodiment example, the guide device is arranged at a lower end of the sliding screen in the vertical direction and adapted to carry the weight of the sliding screen.

Further advantages and advantageous features of the invention are disclosed in the following description and in the dependent claims.

BRIEF DESCRIPTION OF THE DRAWING

With reference to the appended drawings, below follows a more detailed description of embodiments of the invention cited as examples.

In the drawings.

DETAILED DESCRIPTION

Figure 1A:
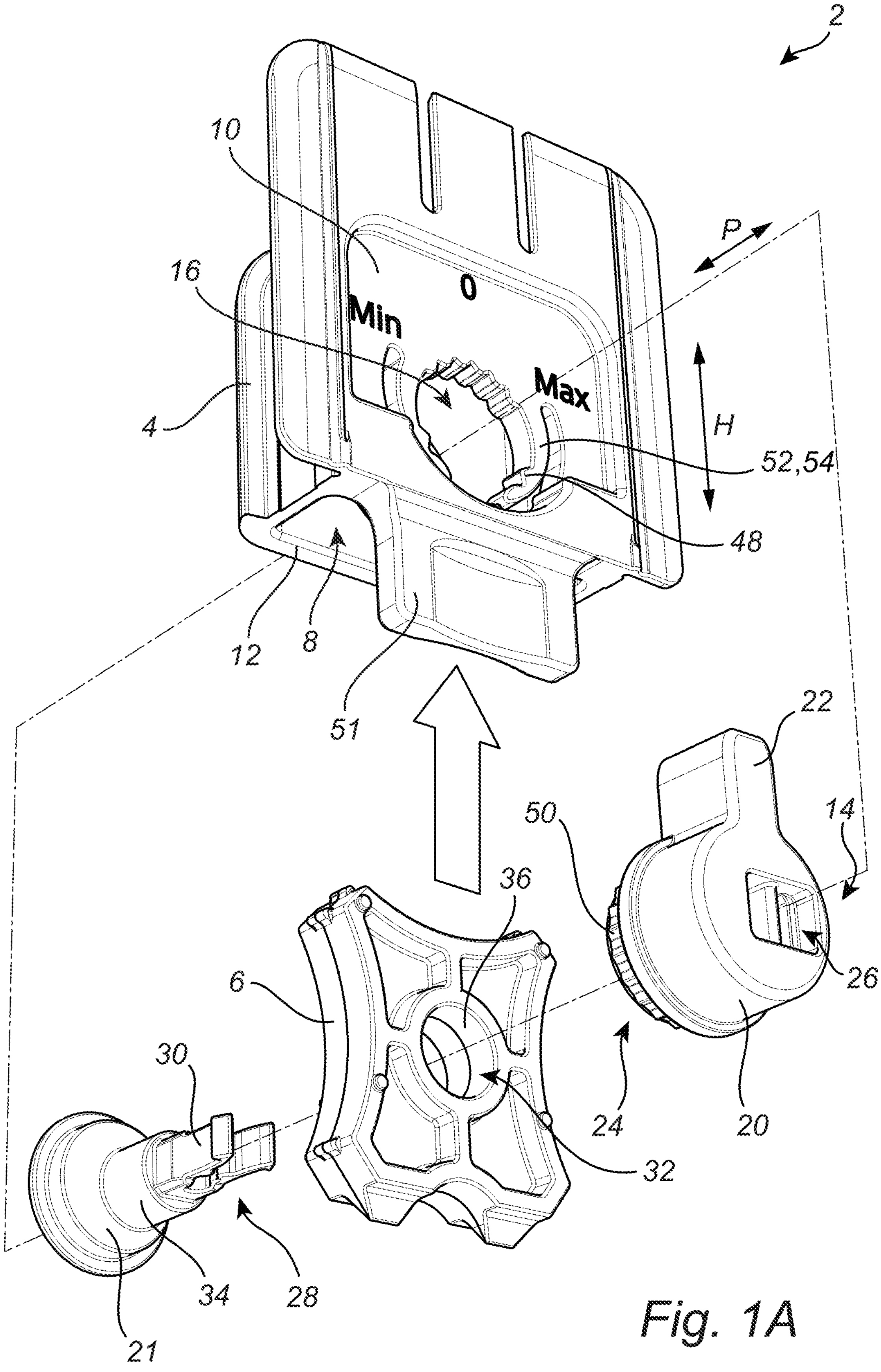
FIG. 1A is a perspective exploded view of a guide device according to a first embodiment in a front view.
Figure 1B:
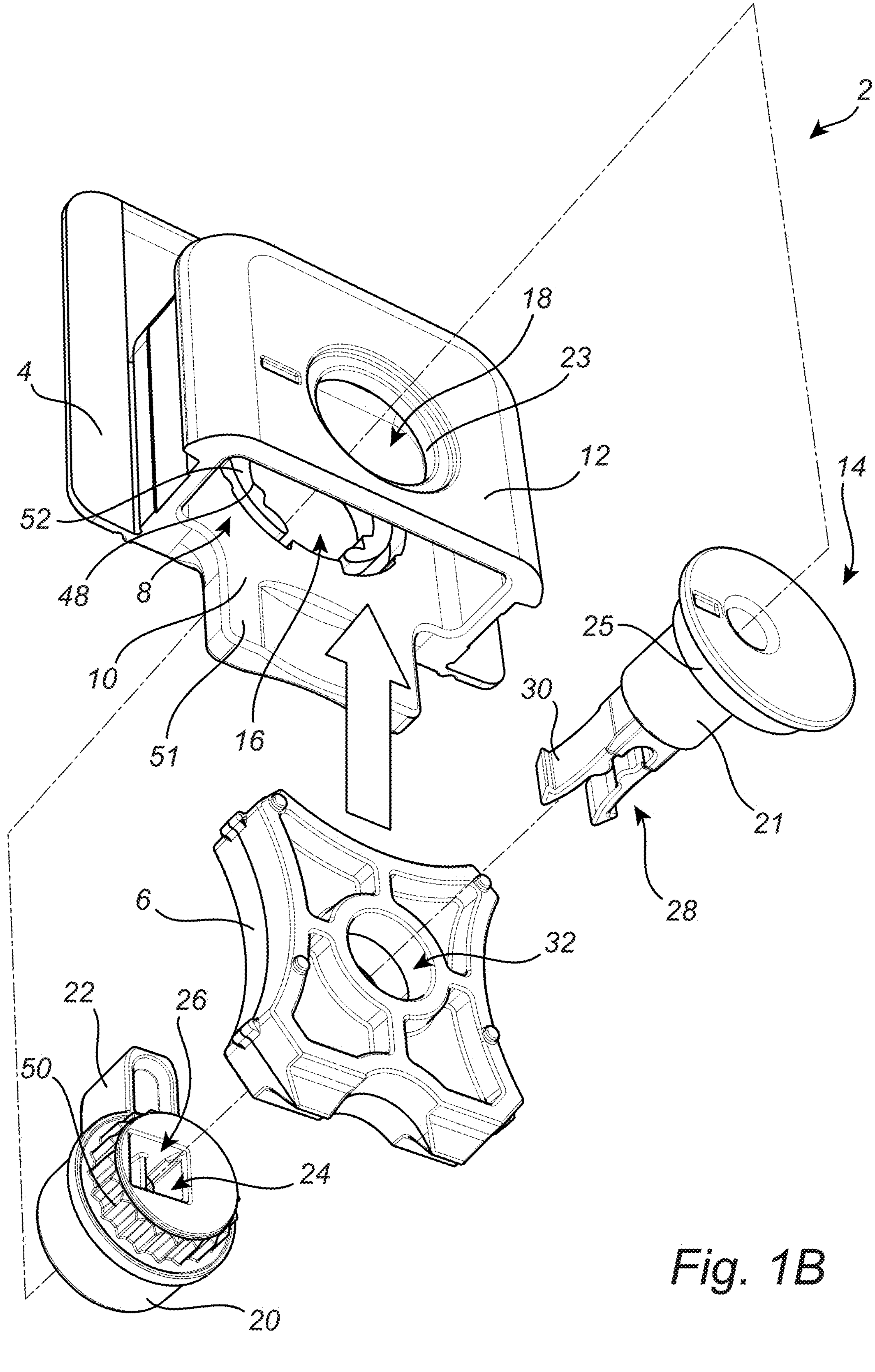
FIG. 1B is a perspective exploded view of the guide device in FIG. 1A in a rear view.

FIG. 1A is a perspective exploded view of a guide device 2 for a sliding screen according to a first embodiment in a front view and FIG. 1B is a corresponding view of the guide device 2 in a rear view.

The guide device 2 comprises a housing 4, a height adjustment element 6 arranged to be set in different positions in a height direction H relative to the housing 4. The housing 4 comprises a receptacle 8 for receipt of the height adjustment element 6. More specifically, the housing 4 comprises a first wall 10 and a second wall 12 spaced from the first wall 10 so that the receptacle is formed between the walls 10, 12.

The guide device 2 further comprises a manually operable pivot means 14 pivotably connected to the housing 4 for pivoting around a pivot axis P and operatively connected to the height adjustment element 6 for moving the height adjustment element in the height direction when pivoted.

The first wall 10 of the housing 4 is provided with a first through hole 16 and the second wall 12 of the housing 4 is provided with a second through hole 18. The first through hole 16 and the second through hole 18 are arranged in line with each other forming a common through hole of the housing 4. The manually operable pivot means 14 comprises a first part 20 adapted to be moved into the first through hole 16 from a first end of the common through hole and a second part 21 adapted to be moved into the second through hole 18 from a second end of the common through hole. The first part 20 and the second part 21 are adapted for being rotationally rigidly connected to each other via a relative motion in parallel with an axis of said through holes 16, 18.

The second wall 12 of the housing 4 has an inner peripheral surface 23 around the second through hole 18. The circular inner peripheral surface 23 defines a bearing engagement structure. The second part 21 of the manually operable pivot means 14 comprises a corresponding outer peripheral surface 25 defining a corresponding bearing engagement structure. The second part 21 of the manually operable pivot means 14 is adapted to be received in the second through hole 18 so that the engagement structures engage each other. More specifically, each one of the inner peripheral surface 23 and the outer peripheral surface 25 has a circular cylindrical shape for allowing a relative pivoting movement between the manually operable pivot means 14 and the second wall 12.

The first part 20 comprises a handle 22 for being pivoted by a user for pivoting the manually operable pivot means 14 relative to the housing 4. The first part 20 further comprises a recess 24 having a first engagement structure 26. The second part 21 comprises a projection 28 having a second engagement structure 30. More specifically, the first engagement structure 26 and the second engagement structure 30 are adapted for a snapping engagement during the relative motion in parallel with the axis of said through hole. More specifically, each one of the recess 24 and the projection 28 is provided with a non-circular engagement surface. More specifically, each one of the recess 24 and the projection 28 is provided with a rectangular engagement surface. Further, the projection 28 is provided with two spaced flexible fingers, which are adapted to be received in the recess 24.

The height adjustment element 6 comprises a through hole 32, which is adapted to receive a portion of the manually operable pivot means 14. The manually operable pivot means 14 is adapted to support the height adjustment element 6 so that the height adjustment element may be moved upwards and downwards, respectively, between the different positions in the height direction corresponding to a pivoting of the manually operable pivot means clockwise and counter clockwise, respectively.

The projection 28 of the second part 21 of the manually operable pivot means 14 has an outer peripheral surface 34 which defines a first bearing engagement structure and the height adjustment element 6 comprises a recess 32, which is formed by said through hole, extending in parallel with the pivot axis, wherein an inner peripheral surface 36 defining the recess 32 defines a second bearing engagement structure and wherein the projection 28 is adapted to be received in the recess 32 so that the first engagement structure and the second engagement structure engage each other. More specifically, each one of the projection 28 and the recess 32 has a circular cylindrical shape for allowing a relative pivoting movement between the manually operable pivot means 14 and the height adjustment element 6. Further, a centre axis 38 of the projection 28 of the manually operable pivot means 14 is in parallel with and offset in relation to the pivot axis P, see FIG. 2. Whilst the second part 21 of the manually operable pivot means 14, in particular the outer peripheral surface 34, is shown having a substantially circular profile, in some embodiments it may have a substantially square profile, in particular at its base.

The housing 4 comprises a first toothed structure 48 extending in a circular path around the pivot axis P. Further, the manually operable pivot means 14 comprises a second toothed structure 50 extending in a circular path around the pivot axis, wherein the manually operable pivot means 14 is adapted to be arranged relative to the housing so that the first toothed structure 48 and the second toothed structure 50 engage each other, wherein the toothed structures 48, 50 define a plurality of discrete relative angular positions, which correspond to the different positions of the height adjustment element 6 in the height direction relative to the housing 4. In some embodiments, the spacing of the teeth may be irregular. For example, the first toothed structure 48 may have fewer teeth (i.e. a larger gap between angular positions) at the bottom of the housing 4 than at the top.

More specifically, the housing 4 comprises one or more radially flexible fingers 52, 54. In the example show, the housing 4 comprises two spaced fingers 52, 54, one on each side of the pivot axis P, that are radially flexible relative the pivot axis P towards and away from each other. Each finger 52, 54 comprises a section of the first toothed structure 48 and is adapted to flex radially outwards during pivoting when opposite teeth meet and back again when the teeth of one of the first toothed structure 48 and the second toothed structure 50 meet spaces between the teeth of the other one of the first toothed structure and the second toothed structure during height adjustment. Thus, the first toothed structure 48 is non-continuous/interrupted in the circumferential direction. The purpose of the fingers 52, 54 is to allow the handle 22 to be turned between the different distinct height positions using a suitable force. In other words, if there were no flexible fingers, it would require more force to move the handle 22. Furthermore, the teeth will be experience less wear in the presence of the flexible fingers 52, 54 relative to the case of a rigid structure.

More specifically, the manually operable pivot means 14 comprises a projection that comprises the second toothed structure 50. The second toothed structure 48 is continuous in the circumferential direction.

Further, the manually operable pivot means 14 is arranged relative to the housing 4 in a way that the pivot axis P is perpendicular relative to the height direction H.

Figure 5:
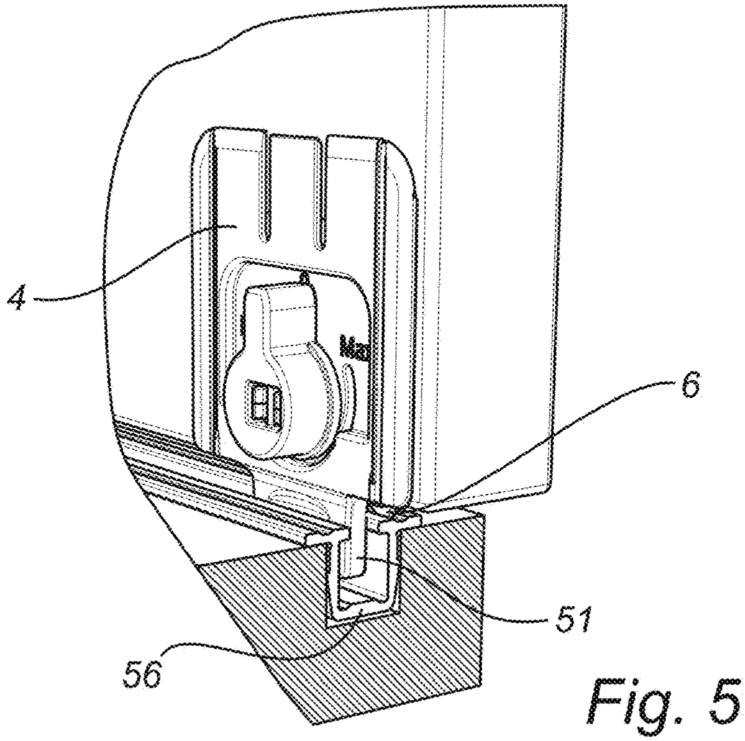
FIG. 5 is a partly cut perspective view of the sliding screen system according to FIG. 4.

Further, the housing 4 comprises a safety portion 51 in the form of a fin adapted for being received in an elongated slide rail 56, see FIG. 5, for reducing the risk that the sliding screen will be displaced transversally relative to the elongated slide rail.

Figure 2:
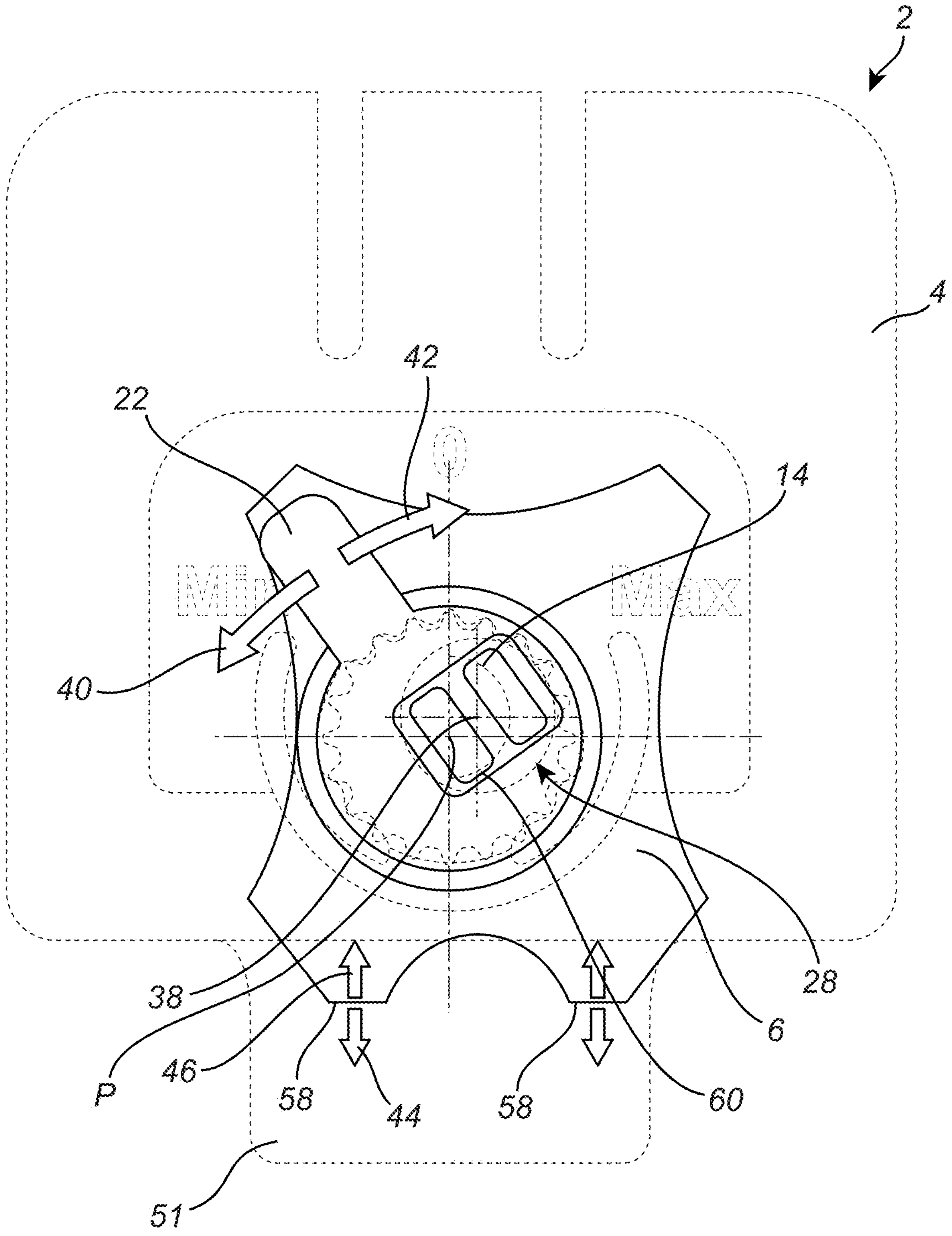
FIG. 2 is a side view of parts of the guide device in FIG. 1A, FIG. 3A, FIG. 3B and FIG. 3C indicate operations for different height positions of a height adjustment element in the guide device in FIG. 1A.

FIG. 2 is a side view of parts of the guide device 2 in FIG. 1A. More specifically, the arrangement and operation of the height adjustment element 6 and the manually operable pivot means 14 is disclosed in more detail. Movement of the handle 22 around the pivot axis P is indicated via arrows 40, 42. Such a movement of the handle 22 results in a height adjustment of the height adjustment element 6, see arrows 44, 46.

More specifically, the height adjustment element 6 is adapted to be moved in an arcuate path 60 relative to the housing 4 around the pivot axis P between the different positions in the height direction. More specifically, the height adjustment element 6 is adapted to be arranged parallel displaced in different height positions along the arcuate path. It will be shown in more detail in FIG. 3A, FIG. 3B and FIG. 3C.

The height adjustment element 6 is adapted for being guided by an associated elongated slide rail 56 (see FIG. 4) during movement of the guide device 2 relative to the elongated slide rail and wherein the height adjustment regards adjustment in a direction perpendicular to the elongated slide rail. Further, the height adjustment element 6 comprises a first slide surface 58 that is adapted for a sliding contact with a second slide surface of the elongated slide rail 56 during the movement of the guide device 2 relative to the elongated slide rail.

Figures 3A, 3B, 3C:
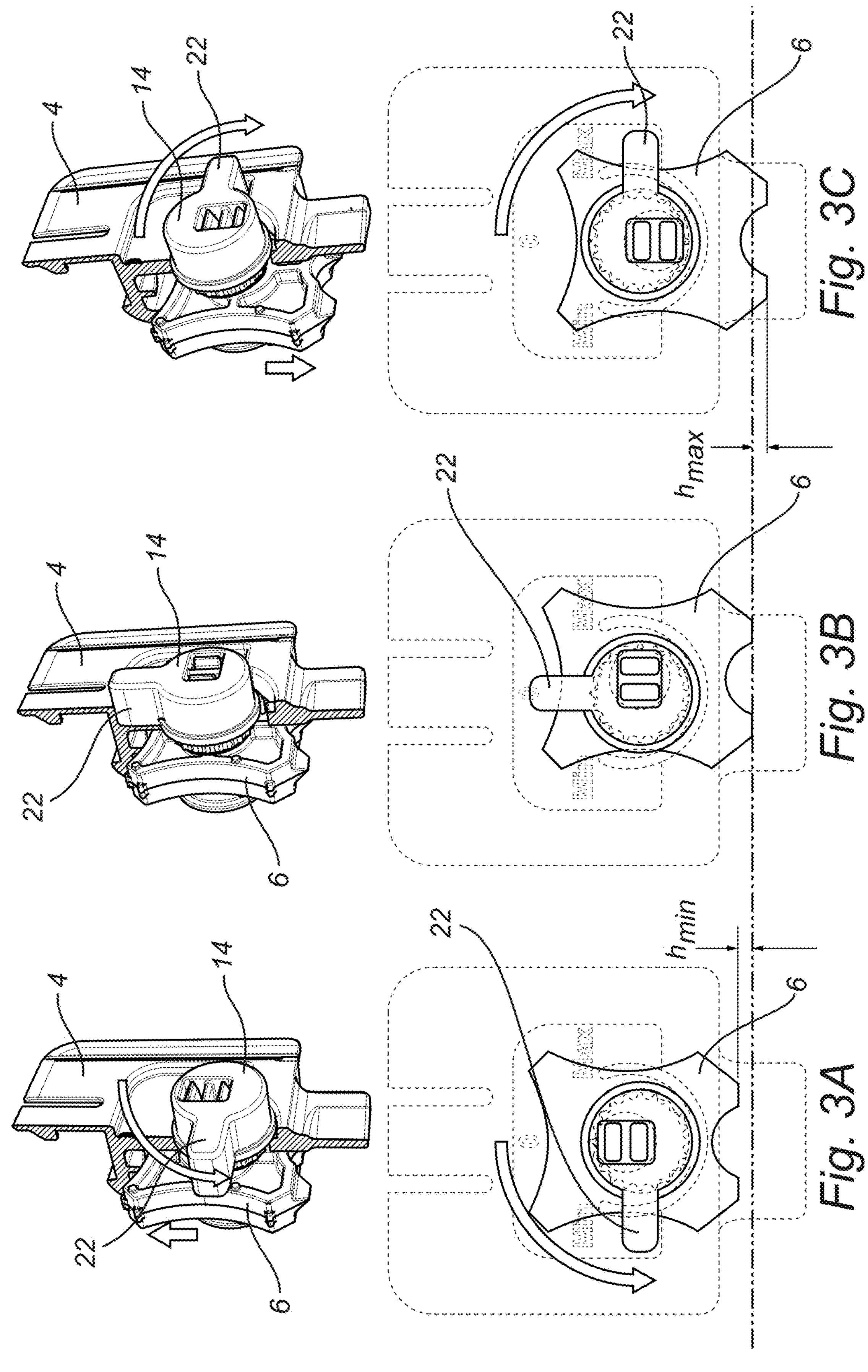

FIG. 3A, FIG. 3B and FIG. 3C indicate operations for different height positions of the height adjustment element 6 in the guide device 2 in FIG. 1A. More specifically, FIG. 3A indicates the handle 22 of the manually operable pivot means 14 being moved to an end stop in the counterclockwise direction defining a maximally withdrawn position of the height adjustment element 6, see minimum height $h_{min}$. In a similar manner, FIG. 3C indicates the handle 22 of the manually operable pivot means 14 being moved to an end stop in the clockwise direction defining a maximally extended position of the height adjustment element 6, see maximum height $h_{max}$. FIG. 3B indicates the handle 22 of the manually operable pivot means 14 being moved to a center intermediate position in the clockwise direction between the end stop positions defining a nominal height position of the height adjustment element 6.

Figure 4:
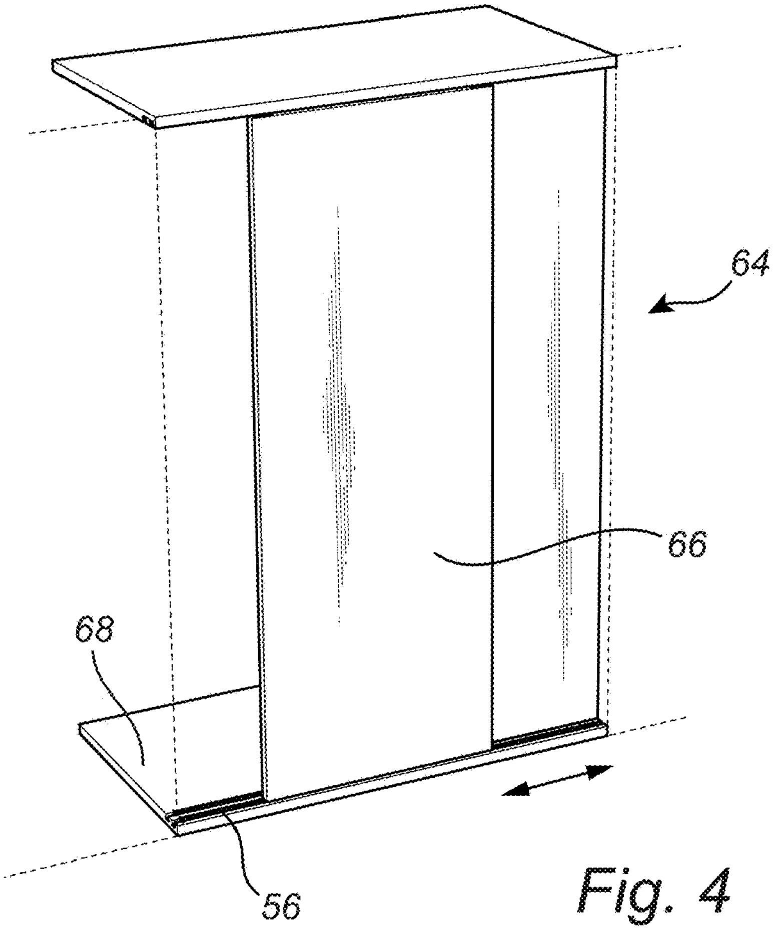
FIG. 4 is a perspective view of a sliding screen system for a sliding screen comprising the guide device in FIG. 1A.

FIG. 4 is a perspective view of a sliding screen system 64 for a sliding screen 66 comprising the guide device 2 in FIG. 1A and the elongated slide rail 56, wherein the elongated slide rail 56 and the guide device 2 are adapted for contacting each other during movement of the guide device along the elongated slide rail. The sliding screen system further comprises the sliding screen 66 and a platform 68, wherein the housing 4 is adapted for being rigidly connected to the sliding screen 66, see FIG. 5, and the elongated slide rail 56 is adapted for being rigidly connected to the platform 68 so that the sliding screen may be moved relative to the platform in a way that the height adjustment element 6 is in engagement with the elongated slide rail. The guide device 2 is arranged at a lower end of the sliding screen 66 in the vertical direction and adapted to carry the weight of the sliding screen.

The safety portion 51 of the housing 4 is received in the elongated slide rail 56 in a way that a free end of the safety portion is positioned at a distance from a bottom surface of the slide rail. Further, the sliding screen is arranged in such a way relative to the elongated slide rail 56 that the safety portion 51 of the housing 4 is received in the elongated slide rail 56 in a way that opposite contact surfaces of the safety portion 51 are spaced from the associated contact surfaces of the walls of the elongated slide rail 56. In other words, the guide portion 51 of the housing 4 runs free from contact with the elongated slide rail 56 in a normal state.

Also disclosed are examples according to the following clauses:

1. A guide device (2) for a sliding screen system comprising a housing (4), a height adjustment element (6) arranged to be set in different positions in a height direction (H) relative to the housing, a manually operable pivot means (14) pivotably connected to the housing (4) for pivoting around a pivot axis (P) and operatively connected to the height adjustment element (6) for moving the height adjustment element (6) in the height direction when pivoted, wherein the manually operable pivot means (14) is adapted to support the height adjustment element (6) so that the height adjustment element may be moved upwards and downwards, respectively, between the different positions in the height direction (H) corresponding to a pivoting of the manually operable pivot means (14) clockwise and counter clockwise, respectively.
2. A guide device according to clause 1, wherein the height adjustment element (6) is adapted to be moved in an arcuate path (60) relative to the housing (4)

around the pivot axis (P) between the different positions in the height direction (H).

3. A guide device according to clause 2, wherein the height adjustment element (6) is adapted to be arranged parallel displaced in different height positions along the arcuate path.

4. A guide device according to any preceding clause, wherein a first one of the manually operable pivot means (14) and the height adjustment element (6) comprises a projection (28) extending in parallel with the pivot axis, wherein an outer peripheral surface (34) of the projection defines a first engagement structure, and wherein a second one of the manually operable pivot means (14) and the height adjustment element (6) comprises a recess (32) extending in parallel with the pivot axis, wherein an inner peripheral surface (36) defining the recess defines a second engagement structure and wherein the projection is adapted to be received in the recess so that the first engagement structure and the second engagement structure engage each other.

5. A guide device according to clause 4, wherein each one of the projection (28) and the recess (32) has a circular cylindrical shape for allowing a relative pivoting movement between the manually operable pivot means and the height adjustment element.

6. A guide device according to clause 4 or 5, wherein a centre axis (38) of the projection (28) or recess (32) of the manually operable pivot means (14) is in parallel with and offset in relation to the pivot axis (P).

7. A guide device according to any preceding clause, wherein the housing (4) comprises a through hole (16, 18) adapted to receive a portion of the manually operable pivot means (14), wherein the through hole extends in a transverse direction relative to the height direction (H), wherein the manually operable pivot means (14) comprises a first part (20) adapted to be moved into the through hole from a first end of the through hole and a second part (21) adapted to be moved into the through hole from a second end of the through hole and wherein the first part and the second part are adapted for being rotationally rigidly connected to each other via a relative motion in parallel with an axis of said through hole.

8. A guide device according to clause 7, wherein the first part (20) comprises a handle (22) for being pivoted by a user for pivoting the manually operable pivot means relative to the housing.

9. A guide device according to clause 7 or 8, wherein the second part (21) comprises the projection (28) or recess provided with the first engagement structure or second engagement structure.

10. A guide device according to any one of clauses 7-9, wherein the first part (20) and the second part (21) comprises snap engagement structures (26, 30) for a snapping engagement during the relative motion in parallel with the axis of said through hole.

11. A guide device according to any preceding clause, wherein the housing (4) comprises a first toothed structure (48) extending in a circular path around the pivot axis (P), wherein the manually operable pivot means (14) comprises a second toothed structure (50) extending in a circular path around the pivot axis (P), wherein the manually operable pivot means is adapted to be arranged relative to the housing so that the first toothed structure and the second toothed structure engage each other, wherein the toothed structures define a plurality of discrete relative angular positions, which correspond to the different positions of the height adjustment element in the height direction relative to the housing.

12. A guide device according to clause 11, wherein the housing (4) comprises at least one finger (52) that is radially flexible relative the pivot axis (P) and that comprises a section of the first toothed structure (48) and is adapted to flex radially outwards during pivoting when opposite teeth meet and back again when the teeth of one of the first toothed structure and the second toothed structure meet spaces between the teeth of the other one of the first toothed structure and the second toothed structure during height adjustment.

13. A guide device according to any preceding clause, wherein the manually operable pivot means (14) is arranged relative to the housing (4) in a way that the pivot axis (P) is perpendicular relative to the height direction (H).

14. A guide device according to any preceding clause, wherein the guide device (2) is adapted for being guided by an associated elongated slide rail (56) during movement of the guide device (2) relative to the elongated slide rail (56) and wherein the height adjustment regards adjustment in a direction perpendicular to the elongated slide rail.

15. A guide device according to clause 14, wherein the height adjustment element (4) comprises a first slide surface (58) that is adapted for a sliding contact with a second slide surface of the elongated slide rail during the movement of the guide device relative to the elongated slide rail.

16. A sliding screen system (64) for a sliding screen (66), wherein the sliding screen system comprises the guide device (2) according to any preceding clause, and an elongated slide rail (56), wherein the elongated slide rail and the guide device are adapted for contacting each other during movement of the guide device along the elongated slide rail.

17. A sliding screen system (64) according to clause 16, wherein the sliding screen system comprises a sliding screen (66), a platform (68) and a guide device (2) according to any one of clauses 1-15, wherein the housing (4) is adapted for being rigidly connected to the sliding screen (66) and the elongated slide rail (56) is adapted for being rigidly connected to the platform (68) so that the sliding screen may be moved relative to the platform in a way that the height adjustment element is in engagement with the elongated slide rail.

18. A sliding screen system (64) according to clause 16 or 17, wherein the guide device (2) is arranged at a lower end of the sliding screen (66) in the vertical direction and adapted to carry the weight of the sliding screen.

It is to be understood that the present invention is not limited to the embodiments described above and illustrated in the drawings; rather, the skilled person will recognize that many changes and modifications may be made within the scope of the appended claims.

The invention claimed is:

1. A guide device comprising:

a housing;

a height adjustment element arranged to be set in different positions in a height direction relative to the housing;

a manually operable pivot pivotably connected to the housing for pivoting around a pivot axis and operatively connected to the height adjustment element for moving the height adjustment element in the height direction when pivoted, wherein the manually operable pivot is adapted to support the height adjustment element so that the height adjustment element may be moved upwards and downwards, respectively, between the different positions in the height direction corresponding to a pivoting of the manually operable pivot clockwise and counter clockwise, respectively, wherein the housing comprises a first toothed structure extending in a first circular path around the pivot axis, wherein the manually operable pivot comprises a second toothed structure extending in a second circular path around the pivot axis, wherein the manually operable pivot is adapted to be arranged relative to the housing so that the first toothed structure and the second toothed structure engage each other, wherein the toothed structures define a plurality of discrete relative angular positions, which correspond to the different positions of the height adjustment element in the height direction relative to the housing, wherein the housing comprises at least one finger that is radially flexible relative the pivot axis and that comprises a section of the first toothed structure and is adapted to flex radially outwards during pivoting when opposite teeth meet and back again when the teeth of one of the first toothed structure and the second toothed structure meet spaces between the teeth of the other one of the first toothed structure and the second toothed structure during height adjustment.

2. The guide device of claim 1, wherein the height adjustment element is adapted to be moved in an arcuate path relative to the housing around the pivot axis between the different positions in the height direction.

3. The guide device of claim 2, wherein the height adjustment element is adapted to be arranged parallel displaced in different height positions along the arcuate path.

4. The guide device of claim 1, wherein:

a first one of the manually operable pivot and the height adjustment element comprises a projection extending in parallel with the pivot axis, an outer peripheral surface of the projection defines a first engagement structure, a second one of the manually operable pivot and the height adjustment element comprises a recess extending in parallel with the pivot axis, an inner peripheral surface defining the recess defines a second engagement structure, and the projection is adapted to be received in the recess so that the first engagement structure and the second engagement structure engage each other.

5. The guide device of claim 4, wherein each one of the projection and the recess has a circular cylindrical shape for allowing a relative pivoting movement between the manually operable pivot and the height adjustment element.

6. The guide device of claim 5, wherein a centre axis of the projection or the recess of the manually operable pivot is in parallel with and offset in relation to the pivot axis.

7. The guide device of claim 4, wherein a centre axis of the projection or the recess of the manually operable pivot is in parallel with and offset in relation to the pivot axis.

8. The guide device of claim 4, wherein:

the housing comprises a through hole adapted to receive a portion of the manually operable pivot, the through hole extends in a transverse direction relative to the height direction, the manually operable pivot comprises a first part adapted to be moved into the through hole from a first end of the through hole and a second part adapted to be moved into the through hole from a second end of the through hole, and the first part and the second part are adapted for being rotationally rigidly connected to each other via a relative motion in parallel with an axis of said through hole.

9. The guide device of claim 8, wherein the first part comprises a handle for being pivoted by a user for pivoting the manually operable pivot relative to the housing.

10. The guide device of claim 9, wherein the second part comprises the projection or the recess provided with the first engagement structure or the second engagement structure.

11. The guide device of claim 9, wherein the first part and the second part comprise snap engagement structures for a snapping engagement during the relative motion in parallel with the axis of said through hole.

12. The guide device of claim 8, wherein the second part comprises the projection or the recess provided with the first engagement structure or the second engagement structure.

13. The guide device of claim 12, wherein the first part and the second part comprise snap engagement structures for a snapping engagement during the relative motion in parallel with the axis of said through hole.

14. The guide device of claim 8, wherein the first part and the second part comprise snap engagement structures for a snapping engagement during the relative motion in parallel with the axis of said through hole.

15. The guide device of claim 1, wherein the manually operable pivot is arranged relative to the housing in a way that the pivot axis is perpendicular relative to the height direction.

16. The guide device of claim 1, wherein:

the guide device is adapted for being guided by an associated elongated slide rail during movement of the guide device relative to the elongated slide rail, and the height adjustment regards adjustment in a direction perpendicular to the elongated slide rail.

17. The guide device of claim 16, wherein the height adjustment element comprises a first slide surface that is adapted for a sliding contact with a second slide surface of the elongated slide rail during the movement of the guide device relative to the elongated slide rail.

18. A sliding screen system comprising:

a guide device; and an elongated slide rail, wherein the elongated slide rail and the guide device are adapted for contacting each other during movement of the guide device along the elongated slide rail, and wherein the guide device comprises:

a housing;

a height adjustment element arranged to be set in different positions in a height direction relative to the housing;

a manually operable pivot pivotably connected to the housing for pivoting around a pivot axis and operatively connected to the height adjustment element for moving the height adjustment element in the height direction when pivoted, wherein the manually operable pivot is adapted to support the height adjustment element so that the height adjustment element may be moved upwards and downwards, respectively. between the different positions in the height direction corresponding to a pivoting of the manually operable pivot clockwise and counter clockwise, respectively, wherein the housing comprises a first toothed structure extending in a first circular path around the pivot axis, wherein the manually operable pivot comprises a second toothed structure extending in a second circular path around the pivot axis, wherein the manually operable pivot is adapted to be arranged relative to the housing so that the first toothed structure and the second toothed structure engage each other, wherein the toothed structures define a plurality of discrete relative angular positions, which correspond to the different positions of the height adjustment element in the height direction relative to the housing, and wherein the housing comprises at least one finger that is radially flexible relative the pivot axis and that comprises a section of the first toothed structure and is adapted to flex radially outwards during pivoting when opposite teeth meet and back again when the teeth of one of the first toothed structure and the second toothed structure meet spaces between the teeth of the other one of the first toothed structure and the second toothed structure during height adjustment.

19. The sliding screen system of claim 14, further comprising:

a sliding screen; and a platform, wherein the housing is adapted for being rigidly connected to the sliding screen and the elongated slide rail is adapted for being rigidly connected to the platform so that the sliding screen may be moved relative to the platform in a way that the height adjustment element is in engagement with the elongated slide rail.

20. The sliding screen system of claim 19, wherein the guide device is arranged at a lower end of the sliding screen in a vertical direction and adapted to carry a weight of the sliding screen.

* * * * *